March 8, 1960 F. A. MAST 2,927,959

DEVICE FOR REPRODUCING A TELEVISION PICTURE WITH CATHODE-RAY TUBE AND EXTRANEOUS SOURCE OF LIGHT

Filed Aug. 26, 1952 3 Sheets-Sheet 1

INVENTOR.
FRED AUGUST MAST.
BY K. B. Mayr
ATTORNEY.

March 8, 1960 F. A. MAST 2,927,959

DEVICE FOR REPRODUCING A TELEVISION PICTURE WITH CATHODE-RAY TUBE AND EXTRANEOUS SOURCE OF LIGHT

Filed Aug. 26, 1952 3 Sheets-Sheet 2

INVENTOR

Fred August Mast

BY

Pierce, Scheffler & Parker

ATTORNEYS

March 8, 1960 F. A. MAST 2,927,959

DEVICE FOR REPRODUCING A TELEVISION PICTURE WITH CATHODE-RAY TUBE AND EXTRANEOUS SOURCE OF LIGHT

Filed Aug. 26, 1952 3 Sheets-Sheet 3

INVENTOR

Fred August Mast

BY Pierce Scheffler & Parker

ATTORNEYS

United States Patent Office 2,927,959

Patented Mar. 8, 1960

2,927,959

DEVICE FOR REPRODUCING A TELEVISION PICTURE WITH CATHODE-RAY TUBE AND EXTRANEOUS SOURCE OF LIGHT

Fred August Mast, Zurich, Switzerland, assignor, by mesne assignments, to Gesellschaft zur Forderung der Forschung an der Eidg. Technischen Hochschule, Zurich, Switzerland

Application August 26, 1952, Serial No. 306,425

Claims priority, application Switzerland November 30, 1948

8 Claims. (Cl. 178—7.5)

This application, which is a continuation-in-part of my co-pending application Serial No. 79,863, filed March 5, 1949, now abandoned, relates to apparatus for reproducing on a screen large sized televised pictures or the like that employ a separate source of light as distinguished from the more conventional "home receiver" wherein the picture is produced on the fluorescent face of a cathode ray tube by sweeping the same with a modulated cathode ray beam.

The general system of television picture projection upon which the present invention is deemed to constitute a marked improvement can be found in two United States Patents Nos. 2,391,450 and 2,391,451, issued December 25, 1945 to Friedrich E. Fischer. As has been described in those patents, the televised picture is reproduced at very large size on a screen from a separate light source of high intensity, the light flux from such source being controlled by a control medium, stretched out in a flat layer, in such manner that the length of the optical path within the control layer through which the light passes is varied in a point-to-point manner in accordance with the modulation of the video or picture signal. Such modulation can be carried by a correspondingly modulated electron beam, i.e. a cathode ray beam that is caused to scan in adjacent lines a rectangular area on the surface of the control layer and causes its surface to be correspondingly deformed by electrostatic forces proportional to the television picture content thereby setting up the point-by-point change in optical path length through the control layer.

Deformations in the layer provide excellent storage of the incoming video signals and in the system disclosed in U.S. Patent 2,391,451 the control layer is disposed in a Schlieren optic system which effects corresponding control of the light between the source and screen. The Schlieren optic system comprises two slit and bar systems placed on opposite sides of the layer. One or more slits of the "first" system i.e. the one nearest the light source are imaged by a suitable optical system on corresponding bars of the "second" system i.e. the one nearest the screen in such manner that no light from the source can reach the screen if the control layer is flat and undeformed by the cathode ray beam. If however the layer is deformed by modulation of the beam, then according to the theory of Fischer, the surface becomes prismlike and hence light passing from the slits of the first system through the film will be changed in direction by refraction at the prismatic faces and pass by the edges of the bars of the "second" system and thence to the screen. The magnitude of the change in direction of the light rays at the surface of the film is of course related to the magnitude of the deformation and since the latter is related to the modulation of the beam, it follows that the shift in direction of the light rays and hence the amount of light which escapes by the edges of the bars of the "second" system onto the screen will also be related to modulation of the beam.

The television projection system as disclosed in the Fischer patents aforesaid and particularly No. 2,391,451 has however not been entirely without difficulty in engineering a commercially satisfactory embodiment offering high contrast pictures, minimum distortion and practical size.

In order to produce a picture of high contrast, it is necessary to eliminate as far as possible all stray light which passes by the edges of the bars of the "second" bar system under a condition where the control layer is in an undeformed state representative of zero modulation. Theoretically, all light coming from the source through the control layer under these conditions should fall upon and be blocked by the bars of the "second" bar system to the end that the screen will be entirely black. In practice however, this optimum condition has been unobtainable thus resulting in a reduction in contrast of the projected picture. Stray light may arise, e.g. from inaccuracies of the optical system imaging the slits upon the bars. The accuracy of such an optical image-forming system is restricted, as the system, say an objective lens, will never be free from various disturbing effects, particularly the well-known aberration faults, the combined effect of which may be characterized by the so-called "circle of confusion." An extremely accurate image of the slits is required for high contrast pictures. Assuming a picture contrast, i.e. a ratio of the brightest light spot to the darkest spot, of, e.g. 1:100, the inaccuracies of the image of the slits formed at the bars must obviously be inferior to $\frac{1}{100}$ of the width of the bars. Hence the optical system must provide a circle of confusion inferior to $\frac{1}{100}$ of the bar width. This requirement is, however, very difficult to meet within view of comparatively large relative apertures of the objective lenses employed in practice.

Further shortcomings of such projection systems are caused in the control layer. If, by example, the control layer possesses local inhomogeneties of the refraction index or an uneven thickness, undesired deflection of the light beam will also occur. This deflection must again not exceed $\frac{1}{100}$ of the bar width at the utmost. In practice also this requirement is to be fulfilled only with serious difficulties, particularly in case of a dark field, where the cathode-ray beam passes over the control layer at constant speed with constant intensity. If the control layer presents the slightest variations in electrical conductivity, varying electrostatic forces will be set up in the layer, which cause detrimental deformations.

Even when the disturbing deflections of the light rays are smaller than the diameter of the circle of confusion, small amounts of light will still pass the bars due to chromatic aberrations, these small amounts of light having different color so that a dark field will be projected upon the screen with local variation in color of a very disturbing character.

Many of these disturbing factors giving rise to stray light could be minimized or possibly eliminated entirely by widening the bars of the "second" bar system upon which fall the images of the slits of the "first" bar system but this cannot be done without also suffering a loss in sensitivity. That is to say, since the change in direction of the light rays varies with the video signal, widening of the bars to rid the system of inherent defects means that the system would not respond to low order changes in the video signal for the corresponding changes in direction of the light would be insufficient to swing the rays beyond the widened portions of the bars. Such low order video signals would thus remain masked.

Another practical disadvantage of the Fischer system is that the optical system required too much distance between the first and second sets of bars. The required spacing was approximately four meters which hindered development of a commercial embodiment within acceptable size limitations.

The present invention is directed towards a solution to all of the practical shortcomings of the Fischer system and is predicated upon the discovery that light from the source can be directed in two different ways through the slots of the bar system. Practice has shown that the frequency or period of the high frequency video signal modulated carrier which is applied to the cathode ray beam that scans the layer of the control medium can be made adequate to cause the layer to behave as a phase diffraction grating whereas most of the unwanted deformations of the surface of the control layer are of such dimensions that they practically act by pure refraction. In addition to what has been disclosed in the Fischer patents the difference of the optical behavior of the two aforementioned deformations allows for an arrangement which can separate the effect of the two kinds of deformation. By proper spacing of the bars and slits of the two bar systems according to the present invention it is possible to have the higher order images produced by the diffraction grating fall on the slits of the second bar system and the zero order image to fall on the bars of the second bar system. The location of the higher order images of the diffraction grating depends only on the period of the grating which remains constant since it is determined by the constant frequency of the carrier signal and is entirely independent of the amplitude of the diffraction grating which is determined by the video signal. The useful light is obviously carried by the action of the diffraction grating because this grating in its turn is the carrier of the information of the television picture. In such a system which has a spacing of the bars as it has been described it will be possible to make the bars of the second bar system wider than the zero order image of the slits of the first bar system without detrimentally affecting the sensitivity of the response of the diffraction grating to low order deformations of the control layer corresponding to shadowy parts of the television picture. By so doing one can make the unwanted deformations which as mentioned above cover a great area as compared with the wavelength of the diffraction grating ineffective, as these unwanted deformations act mostly by refraction. Such refraction causes a shift of the zero order image but since the bars of the second system have been widened such a shift is not great enough to allow the refracted rays attributable to unwanted deformations to be deflected beyond the edges of the bars and therefore those rays remain masked by the bars and do not show up as interference on the screen.

Summarizing briefly, in accordance with the present invention a cathode ray beam suitably modulated with the video signal and a constant frequency carrier signal scans an area of the control layer through which projected light passes on its way to a viewing screen and produces raster-shaped point-to-point variations of the optical path length effective for light traversing the layer. Such variations form a raster of constant period and of sufficient fineness to act as a phase diffraction grating, and the amplitude of the variations correspond to the distribution of brightness over the picture to be reproduced on the screen. Moreover the period of the raster, i.e. the period of the point-to-point variations in the optical path for light traversing the layer of the control medium, is so related to the spacing and configuration of the apertures and bars of a Schlieren optic system that some of the higher order images of the apertures formed by the bar system on the side of the control layer nearest the source of light are, by the diffraction effect, located in the apertures between the bars of the other bar system disposed at the opposite side of the control layer. All variation in brightness over the screen, i.e. the picture, is thus attributable entirely to amplitude variations of the higher order images which pass between the bars of the bar system and thence to the screen. Interference is reduced to an inconsequential minimum by making the bars of the bar system at the side of the control layer nearest the screen wider than the breadth of the zero order images of the apertures in the bar system at the opposite side of the control layer, i.e. the side nearest the light source.

In the accompanying drawings which illustrate a preferred embodiment of the invention:

Figure 1:
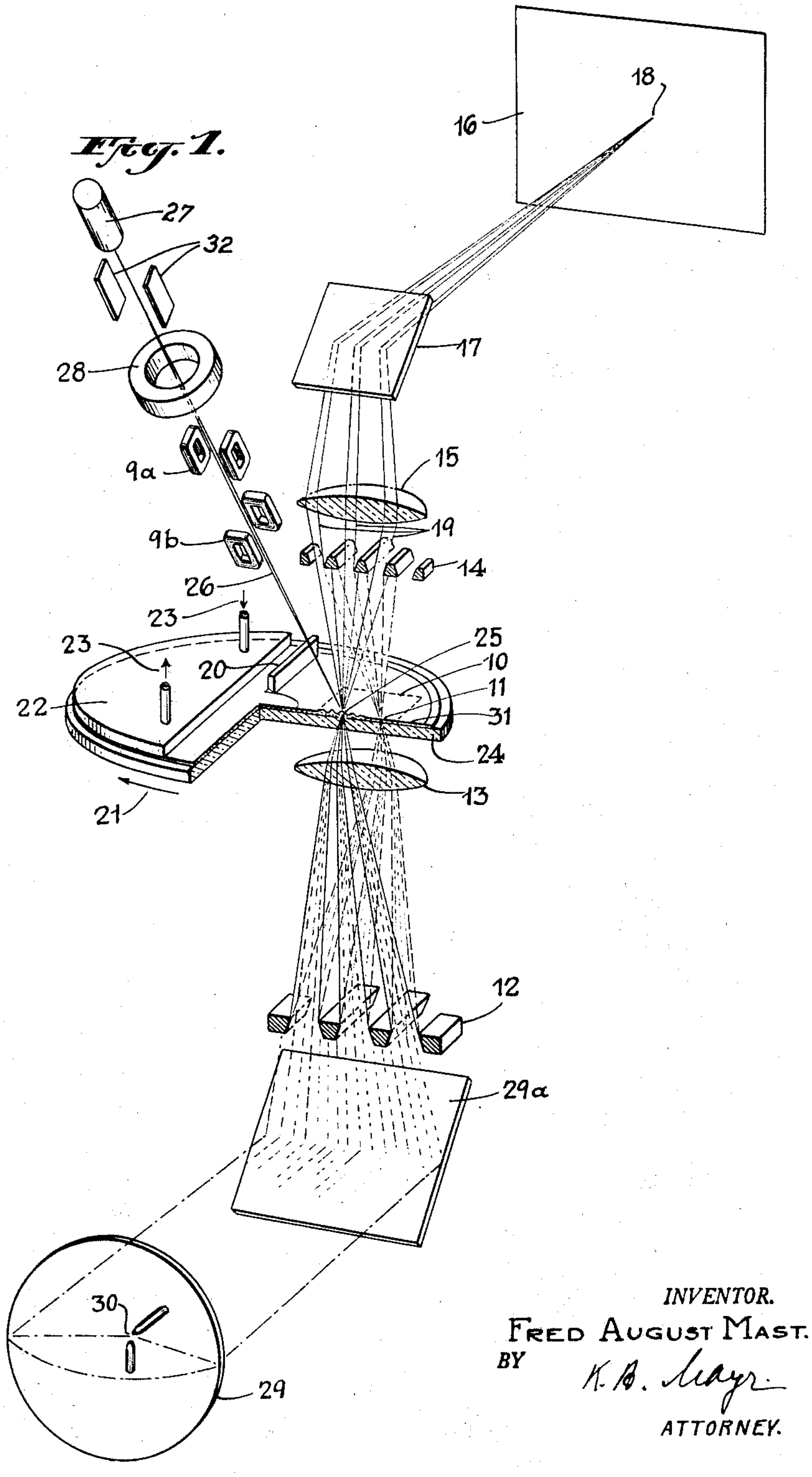
Fig. 1 is a schematic perspective representation of an apparatus for the projection of television pictures, employing the principle of the invention.

With reference now to the schematic perspective representation of apparatus shown in Fig. 1 the light beam produced by a separate light source 30, by way of example an arc lamp, is concentrated by means of a reflector 29 and deflected over deflection mirror **29*a* towards a Schlieren-optic system, employed for light control. This Schlieren-optic system comprises a first slit-and-bar system 12, a lens 13, a second slit-and-bar system 14 and a projection lens 15. The Schlieren-optic system consequently provides apertures and stops successively interposed in the path of light from the separate light source, the apertures being represented by the slits of system 12 located nearer to said source and the stops being represented by the bars of system 14 located farther away from the source. Lens 13 serves to project an image of system 12 upon system 14 in such a manner that images of the apertures nearer to the light source, i.e. of the slits of system 12, are formed at the stops, i.e. on the bars of system 14. A control medium is streched out in a thin layer 31 on a plano-parallel glass plate 24, which is located in between the two bar systems of the Schlieren optic system. The projection lens 15 is located in such a manner to project an image of the control layer 31 upon a projection screen 16 by means of the light issuing from a Schlieren-optic system. A mirror 17** serves to deflect this light in proper direction.

The surface of layer 31 may be deformed as indicated at 25 by electric charges applied to it by means of a cathode ray beam 26 which is generated by an electron gun 27, the beam being concentrated into the film spot on the layer by a focussing coil 28. The cathode beam is deflected in the way well known in television by deflection coils **9*a* and 9*b* and scans, in adjacent lines, a rectangular area 10 on layer 31**.

The deflection of the cathode ray beam is additionally controlled by the deflection plates 32 to which is fed the video signal which is modulated on a high-frequency carrier. The additional deflection caused by the pair of plates 32 acts in the direction of the lines, and thus represents a velocity modulation of the scanning beam.

Hereby a periodically varying distribution of electric charges is effected on layer 31, which produce periodic deformations as indicated at 25. According to the invention these deformations form a raster (or diffraction grating) of substantially constant period and sufficient fineness to act as a phase diffraction grating, the local amplitudes i.e. the height of the deformation of which are determined by the video signal and hence correspond to the distribution of brightness over the picture to be reproduced.

In the case of a dark picture spot, the modulation of the beam is zero and the surface of the appertaining spot on layer 31 remains lane as indicated e.g. at 11. In the case of a bright spot, however, due to velocity modulation of the cathode beam the deformation amplitude is proportional to the desired brightness. Alternatively also the intensity of the cathode beam may be modulated by the video signal together with a constant-frequency carrier so that a raster of electric charges and hence periodic deformations are formed.

As was mentioned above, the bar systems 12 and 14 and lens 13 are so arranged relatively to each other, that the apertures of system 12 are imaged upon the stops of system 14. These consequently block the passage of the light towards the projection lens 15 and the viewing screen 16. If the control layer 31 is unmodulated, i.e. undeformed and plane, it will not interfere with the direction of light traversing it. No light from this spot will consequently issue from the Schlieren-optic system and this point cannot consequently be imaged upon screen 16 by lens 15. This is indicated in the drawing by the light beams shown in dotted lines traversing point 11. If, however, the surface is deformed as indicated at 25 the traversing light rays will be deflected from their original direction by the deformations of the control layer and a certain portion thereof will be able to pass by the bars of system 14. An image of this spot will consequently be projected upon the screen. This is represented in the drawing by the light beams shown in full lines traversing spot 25.

As has been mentioned above the deformations produced on the control layer form a raster of substantially constant period and sufficient fineness to act as a phase diffraction grating. If such a diffraction grating is suitably located with respect to an image forming system such as lens 13 of the Schlieren-system, higher-order images are formed which are displaced with respect to the "zero-order image" which only would be formed by the lens if no diffraction grating was present. According to the invention, the wavelength of this raster is held in suitable relation to the configuration of the apertures and bars of the Schlieren-optic system, so that higher-order images of the slits of system 12 formed by diffraction are substantially located at the openings, i.e. the slits left between the bars of system 14. Furthermore according to the invention, the breadth of the bars of system 14 is made substantially broader than the breadth of the zero order images of the slits of system 12 formed by lens 13.

The apparatus shown schematically in Fig. 1 furthermore comprises other features which do not form an object of the present invention. Thus the support plate 24 is caused to rotate slowly in the direction of arrow 21 and the deformable substance thereon is thus continually smoothed by a rake 20. At the same time, a sector of the control layer is contacted and cooled by a hollow metal plate 22 the temperature of which is maintained at a desired constant value by a cooling agent circulated therethrough as indicated by arrows 23.

Figure 2:
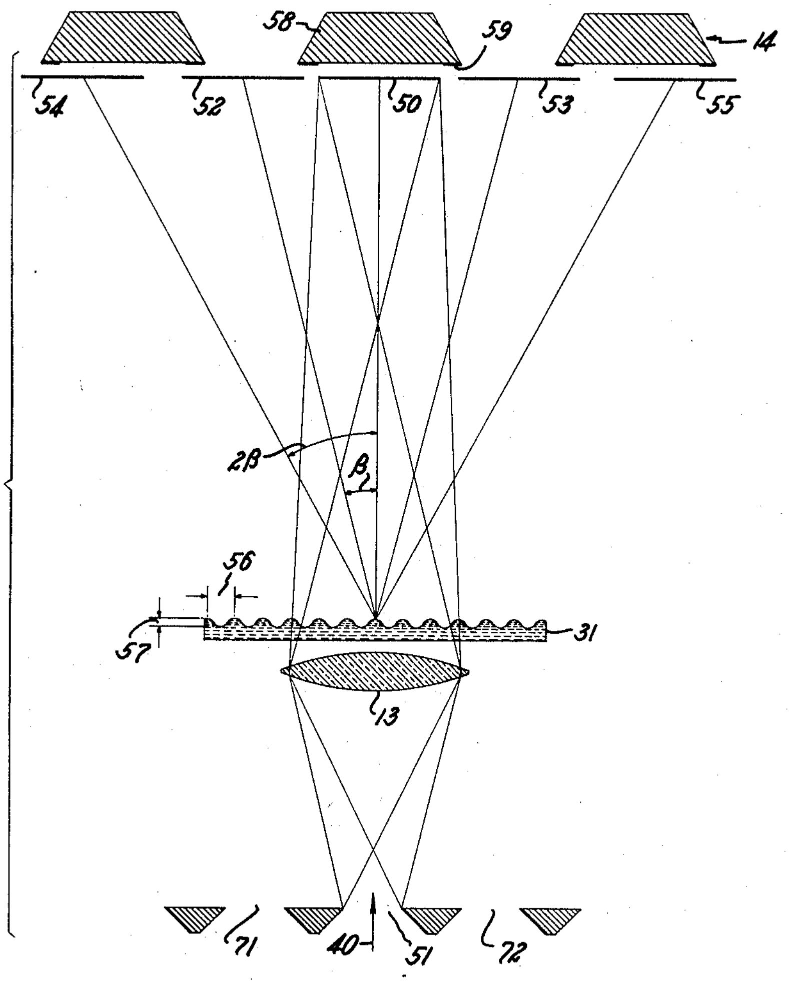
Fig. 2 is a simplified diagrammatic section through a light control system employing a control layer the surface of which is deformed periodically to establish the diffraction grating.

Fig. 2 now serves to give a more detailed explanation of the principle of the present invention and represents a simplified diagrammatic section through the light control system employed by the apparatus of Fig. 1. For the sake of clarity, identical elements are referred to by identical numerals. The slit-and-bar system 12 is illuminated from below in the direction of arrow 40. Images of the slits of system 12 are formed at the bars of system 14 by lens 13. Control layer 31 is interposed into the light path and the surface of the layer is deformed as above described and thus forms a raster of constant wavelength. If the period is sufficiently fine, the surface of the layer thus deformed will act as an absorptionless, i.e. a phase, diffraction grating. The relative dimensions of the bars of the slit-and-bar systems 12 and 14 of lens 13 and the raster deformations on layer 31 of the drawing have been chosen only in view of the clarity of representation.

The average wavelength of visible light is about $.550 \times 10^{-3}$ millimeters. A practical distance between the control layer 31 and the second bar system 14 is about 1000 millimeters and if now the chosen wavelength for the diffraction grating is 0.1 millimeter, the spacing between the zero order image and first order image will be $$\frac{.550 \times 10^{-3}}{0.1} \times 1000$$

which is 5.5 millimeters and the spacing between the bars of bar system 14 should be of the same order of magnitude.

If the control layer is deformed and acts as diffraction grating, not only the ordinary images of the slits of system 12 will be formed at the bars of system 14, but lateral images thereof will appear which are located in the same plane, but which are displaced towards the sides. The ordinary image is generally referred to as "zero-order" image, the other images as "higher-order" images. Thus, e.g. zero-order image 50 of slit 51 is formed by lens 13 substantially at bar 58 of system 14 and the first order images 52 and 53 and the second order images 54 and 55 are disposed towards both sides. The position, i.e. the lateral displacement of the higher-order images is defined by angle $\beta$ which is substantially dependent upon the quotient of the wavelength of the traversing light divided by the period 56 of the deformations. In order to reduce the minimum amplitude which will still produce a satisfactory control effect, the thickness of the control layer is preferably made smaller than the period of the raster.

The energy of light passing through slit 51 is distributed to the different zero and higher order images in a manner which depends upon the amplitude (height) 57 of the deformations and furthermore upon their particular form, i.e. the distribution will be different dependent upon whether the deformations have a sinoidal, sawtoothed, rectangular or other shape, as the case may be.

In any case, however, the lateral displacement of the higher-order images is totally independent of either the amplitude or the particular form of the deformations, and is exclusively determined by the period 56 of the raster.

According to the invention this period is now held in a suitable relation to the configuration of the slit-and-bar systems so that the higher-order images are substantially located at the openings left between the slits of the second system. Preferably the bars and slits are made of equal breadth. The periodical modulation serves to produce raster shaped deformations of constant wavelength whereas modulation by the video signal serves to make the amplitude of these deformations to correspond to the distribution of brightness over the picture to be reproduced. Additionally according to the invention the bars of the second system are made substantially broader than the zero-order images of the slits of the first system, as indicated by enlargement 59.

Figure 3:
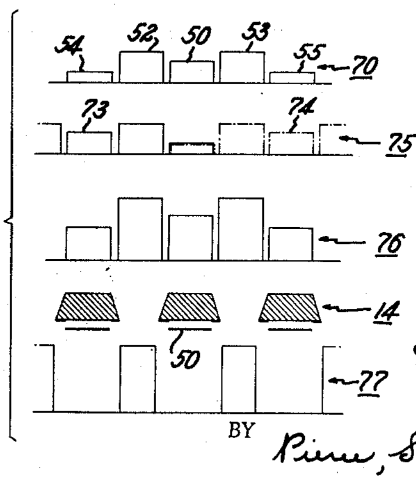
Fig. 3 shows a distribution of light energy to the higher-order images of such a system.

Light control according to the present invention and elimination of disturbances may be easily explained by the aid of Fig. 3 which schematically shows the distribution of light energy to the individual zero or higher-order images. If the slits of the first system are illuminated homogeneously, i.e. if the energy of passing light is distributed uniformly across the slit, light distribution over the individual zero or higher-order images will likewise be uniform. In a given case the light energy passing through a slit, e.g. 51 of system 12 will be distributed across zero image 50 and the higher order images 52, 53, 54 and 55 as shown by diagram 70. The adjoining slits 71 and 72 produce identical distributions of energy 73 and 74, which are, however, laterally displaced each by the distance of the slits as shown by diagram 75. The total distribution of light energy at the plane of the second system 14 is obtained by adding the energy within the images produced by all slits of system 12 and is shown by diagram 76. The light energy passing through the slits of system 14 is represented by diagram 77. In the case shown by Figs. 2 and 3 the first order images were displaced by approximately the lateral extent of the bars of system 14 and are consequently located at the openings left in between the bars. The second order images which are displaced by approximately the double amount are thus located substantially at the adjoining bar. Consequently in the illustrated example practically only light directed to the first order images will pass the bar system 14 and may reach the screen. As the bars are broader than the zero-order images even a part of the light appertaining to the first order images is blocked. As, however the position of the higher-order images is fixed and does not depend upon the amplitude of the deformations, i.e. upon the desired effect of light control, the enlargement of the bars does affect the characteristic of light control but only to a negligible degree. On the other hand the enlarged bars block passage of light from the zero order image even if it be laterally disposed by disturbing effects in the control layer or if the zero order image is not sufficiently focussed due to the aberrations of the image forming system.

Undesired deformations of the control layer caused by the above mentioned disturbances, such as e.g. inhomogeneities of the layer will either not be periodically distributed across the surface or will at least show a considerably longer period than the regular deformations employed for light control. They will consequently not act as diffraction grating, but only as ordinary optical refraction means, such as e.g. prisms. "Long-period" deformations will therefore not produce higher-order images of slit 51, but will only cause a lateral displacement of the zero order image thereof. As bar 58 according to the invention is substantially broader than the zero-order images, light directed to the zero-order image but deviated by disturbing effects such as long period deformations of the layer, inaccuracies of lens 13 etc. will be barred by the enlargements 59 on bar 58. To avoid stray light to be produced by the light impinging upon the enlargements 59, these are preferably given a light absorbing coating as indicated in the drawing.

The sensitivity of the system to disturbances by irregular or long-period deformations of the control layer is substantially reduced by the enlargement of the bars. A slight inclination of the surface will not disturb even a dark picture. The index of refraction may vary locally within certain limits, and the imaging system may have a circle of confusion considerably larger than would be required by the desired picture contrast.

Figure 4:
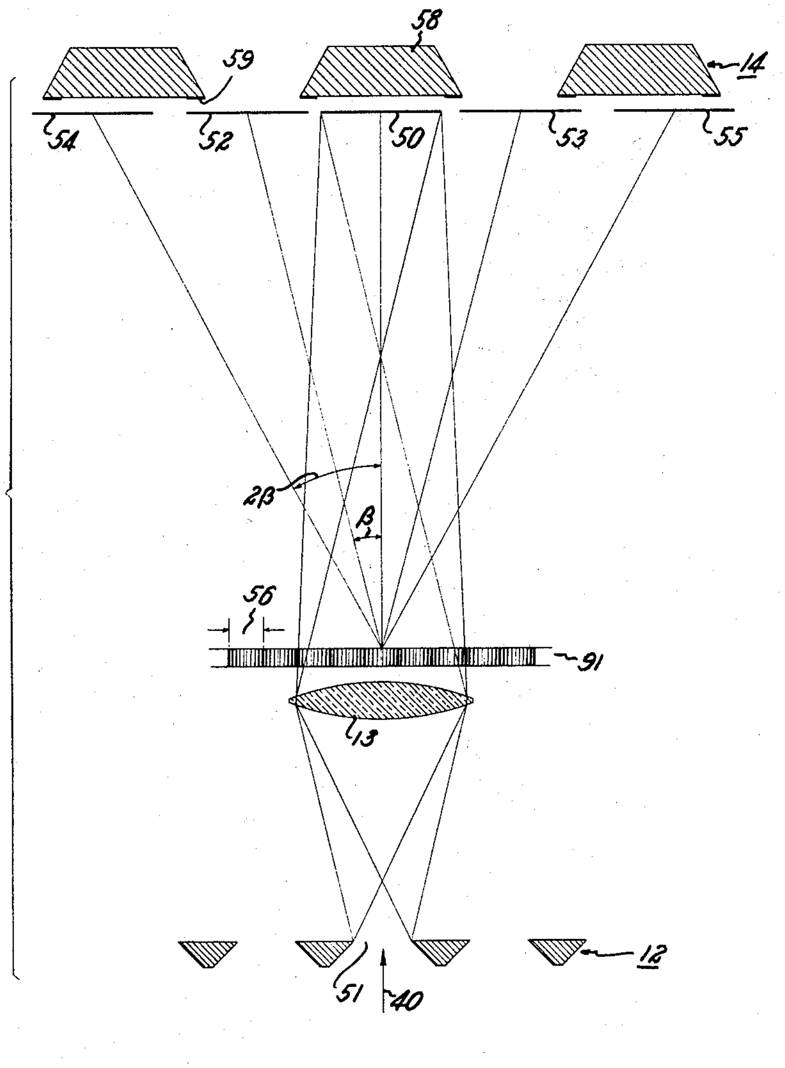
Fig. 4 is a diagram of a modified control system wherein the control layer is constituted by a substance whose refractive index is varied progressively to establish the diffraction grating.

Fig. 4 diagrammatically illustrates another embodiment of a light control system which, in place of the superficially deformed liquid control layer of Fig. 2, employs a substance the refractive index of which is varied. Apart from this control layer 91, the embodiment of Fig. 4 corresponds to that of Fig. 2, like parts being thus given identical reference numerals.

Light passes slits in bar system 12 in the direction of arrow 40 and impinges upon the control layer 91. Slit 51 is again imaged upon bar 58 by means of lens 13, bar 58 providing enlargements 59 on both sides. The substance of the layer 91 has an index of refraction which may be varied by suitable measures. It may consist e.g. of crystals or a crystalline material the refractive index of which may be influenced by the electron density prevailing inside the crystal lattice. Such materials are well known in the art and have been described in detail in U.S. Patents No. 2,306,407, issued December 29, 1942, to Adolf H. Rosenthal, and No. 2,330,171, issued September 21, 1943, also to Rosenthal. The refractive index of such material may be varied by introducing or projecting electrons into the lattice, by means of the cathode-ray beam 26 of Fig. 1. This variation of the refractive index entails a variation of the optically effective path length of the light traversing said layer. If the cathode-ray beam is again periodically modulated in intensity, the variations will be periodically distributed across the layer as indicated by the varying density of shading in the layer, 91 of Fig. 4. Due to the local variation of the optically effective path length the waves of the traversing light will not issue simultaneously from the upper surface of the layer, which will consequently act as an absorption-less diffraction grating in substantially the same way as did the superficially deformed layer of Fig. 2. It will be understood that the effect of such a diffraction grating is due to the variable optical path length, which depends on the geometrical path length inside the layer and on the refractive index thereof.

Layer 91 will consequently produce higher-order images of slit 51 laterally displaced with respect to the zero-order images. This lateral displacement will again depend upon the quotient of the frequency of the traversing light and the period or wavelength 56 of the variations of the refractive index. The amount of light directed to the higher-order images is again dependent upon the amplitude of these variations, which in this case is defined by the ratio of the highest and lowest values of the refractive index along its periodic variations. This is indicated in the drawing by the variable density of shading in layer 91.

Other suitable substances may also be employed for the control layer and point-to-point variation thereof may be produced which will act like a diffraction grating and will thus permit control of the traversing light and if such point-to-point variations may be effected in accordance with the contents of picture to be reproduced. Thus, e.g. double refracting material may be used wherein the refractive index valid for the regular and the irregular ray is capable of being varied.

Preferably the slit system comprises a series of equidistant parallel bars, the slit width being equal to that of the bars separating the slits and the bar system upon which this slit system is imaged including as many bars as there are slits in the slit system. The system of light control is however not restricted to such arrangements as any other configurations providing apertures and stops may be employed.

I claim:

1. Apparatus for producing large television pictures on a screen by means of a cathode ray beam and a separate light source, comprising a system of slits and bars system providing apertures and stops successively interposed in the path of light rays from said source to said screen, images of said apertures of said system nearer to said light source being formed at said stops of said system farther away from said source, a control medium in the form of a flat layer permeable to light interposed in the path of said cathode ray beam and in the path of said light rays from said apertures of said system nearer to said light source to said stops of said system farther away from said light source, said medium layer being alterable by said cathode ray beam for point-to-point variations of the optical path length effective for the light rays passing through said medium layer, deflection means for causing said cathode ray beam to scan an area of said flat medium layer, means for modulating said cathode ray beam with a video signal and a constant frequency carrier signal, whereby, under the action of said cathode ray beam, said area of said medium layer is modified with respect to the optical path length for the light rays traversing said medium layer so that said area acts as a phase diffraction grating, the period of said point-to-point variations being constant as determined by the frequency of said carrier signal and so that at least some of the diffraction established higher order images of said apertures of said system nearer to said light source are located in the apertures between said stops of said system farther away from said light source, the amplitude of said variations being determined by said video signal and hence corresponding to the distribution of brightness over the picture to be produced, and said stops of said system farther away from said light source having a width greater than that of the zero order images of said apertures of said system nearer to said light source, so that said zero order images never pass by the edges of said stops of said system farther away from said light source.

2. Apparatus for producing large television pictures as defined in claim 1 wherein said control medium is constituted by a layer of a material deformable under the action of said cathode ray beam as modulated by said video signal and constant frequency carrier signal to produce said phase diffraction grating, the period of said deformations corresponding to the frequency of said carrier signal and the height of said deformations corresponding to said video signal and hence to the distribution of picture brightness.

3. Apparatus for producing large television pictures as defined in claim 2 wherein the thickness of said control medium layer is less than the period of said deformation of said control medium layer.

4. Apparatus for producing large television pictures as defined in claim 1 wherein said control medium layer is constituted by a material the refraction index of which is varied to effect the said point-to-point variations of the effective optical path length therein.

5. Apparatus for producing large television pictures as defined in claim 1 and which comprises two slit-and-bar systems, images of the slits of the first system nearer to said light source being formed at the bars of the second system farther away from said source, the slits and bars of the first system being equal and the breadth of the bars of the second system being substantially broader than the zero order images of the slits of the first system.

6. Apparatus for producing large television pictures as defined in claim 5 wherein the period of said point-to-point variations of the optical path length through said medium layer is such that the first order images of the slits of the first system are displaced by approximately the dimensions of the bars of the second system.

7. Apparatus for producing large television pictures as defined in claim 5 wherein the total enlargement of the bars of said second system amounts to at least approximately 20% of the breadth of the image of the appertaining slits.

8. Apparatus for producing large television pictures as defined in claim 1 wherein that portion of the stops of said system farther away from the light source which extends beyond the width of the zero order images of the apertures of said system nearer to said source includes a light absorptive coating to prevent the formation of disturbing stray light.

References Cited in the file of this patent

UNITED STATES PATENTS

| | | |
|---|---|---|
| 2,391,451 | Fischer | June 10, 1941 |
| 2,545,974 | Schroeder | Mar. 20, 1951 |

FOREIGN PATENTS

| | | |
|---|---|---|
| 546,462 | Great Britain | July 15, 1942 |

OTHER REFERENCES

Cathode Ray Tube Displays; Soller, Starr and Valley; vol. 22 of Radiation Laboratory Series; McGraw-Hill Book Co., Inc., 1948; pages 724–726.

Introduction to Physical Optics, Robertson, Van Nostrand Co., Inc., New York, 1943; pages 296, 297.

Fundamentals of Optics, Jenkins and White, 2nd ed., McGraw-Hill Co., New York, 1950; page 339.